(12) United States Patent
Spesser et al.

(10) Patent No.: US 9,937,806 B2
(45) Date of Patent: Apr. 10, 2018

(54) VEHICLE COMPRISING A CHARGING SYSTEM FOR A BATTERY

(71) Applicant: Dr. Ing. h.c. F. Porsche Aktiengesellschaft, Stuttgart (DE)

(72) Inventors: Daniel Spesser, Illingen (DE); Juergen Mittnacht, Grafenau (DE)

(73) Assignee: Dr. Ing. h.c.F. Porsche Aktiengesellschaft (DE)

(*) Notice: Subject to any disclaimer, the term of this patent is extended or adjusted under 35 U.S.C. 154(b) by 79 days.

(21) Appl. No.: 15/049,208

(22) Filed: Feb. 22, 2016

(65) Prior Publication Data

US 2016/0243953 A1   Aug. 25, 2016

(30) Foreign Application Priority Data

Feb. 23, 2015  (DE) .................. 10 2015 102 517

(51) Int. Cl.
*H02J 7/00* (2006.01)
*B60L 11/18* (2006.01)
*B60L 15/20* (2006.01)

(52) U.S. Cl.
CPC ....... *B60L 11/1816* (2013.01); *B60L 11/1803* (2013.01); *B60L 11/185* (2013.01); *B60L 11/1812* (2013.01); *B60L 11/1814* (2013.01); *B60L 11/1846* (2013.01); *B60L 11/1861* (2013.01); *B60L 15/20* (2013.01); *B60L 2200/12* (2013.01); *B60L 2200/36* (2013.01); *B60L 2210/10* (2013.01); *B60L 2210/30* (2013.01); *B60L 2210/40* (2013.01); *B60L 2220/54* (2013.01); *B60L 2220/56* (2013.01); *B60L 2240/421* (2013.01); *B60L 2240/423* (2013.01); *B60L 2240/547* (2013.01);

(Continued)

(58) Field of Classification Search
CPC ............................. H02J 7/00; B60L 11/1816
USPC ........................................................ 320/162
See application file for complete search history.

(56) References Cited

U.S. PATENT DOCUMENTS

2008/0013351 A1* 1/2008 Alexander .......... H02M 3/1582
                                                        363/123
2011/0221363 A1   9/2011 De Sousa et al.
(Continued)

FOREIGN PATENT DOCUMENTS

DE   110 2012 205 972     10/2013
JP         H0965509 A       3/1997
(Continued)

OTHER PUBLICATIONS

Japanese Office Action Dated Mar. 22, 2017.
German Search Report dated Jan. 14, 2016.

*Primary Examiner* — Suchin Parihar
(74) *Attorney, Agent, or Firm* — Gerald E. Hespos; Michael J. Porco; Matthew T. Hespos

(57) ABSTRACT

A charging system (2) for a battery (3) has a first electrical terminal (4) for an AC voltage, a second electrical terminal (5) for a DC voltage and a converter (8). The converter (8) is designed to convert the AC voltage of the first terminal (4) into a DC voltage for charging the battery (3), and to convert a magnitude of a DC voltage that is passed from the second terminal (5) to the converter (8) in terms of the magnitude and to forward it to the battery (3). The converter (8) also is designed to convert the DC voltage of the battery (3) into an AC voltage for driving an electric motor (9).

12 Claims, 2 Drawing Sheets

(52) U.S. Cl.
CPC ........ *B60L 2240/549* (2013.01); *Y02T 10/641* (2013.01); *Y02T 10/645* (2013.01); *Y02T 10/7005* (2013.01); *Y02T 10/705* (2013.01); *Y02T 10/7044* (2013.01); *Y02T 10/7072* (2013.01); *Y02T 10/7216* (2013.01); *Y02T 10/7241* (2013.01); *Y02T 10/7275* (2013.01); *Y02T 90/121* (2013.01); *Y02T 90/127* (2013.01); *Y02T 90/128* (2013.01); *Y02T 90/14* (2013.01); *Y02T 90/169* (2013.01); *Y04S 30/14* (2013.01)

(56) References Cited

U.S. PATENT DOCUMENTS

| | | | |
|---|---|---|---|
| 2014/0042807 A1 | 2/2014 | Bouchez et al. | |
| 2015/0001569 A1* | 1/2015 | Yoshitake | C08L 83/14 |
| | | | 257/98 |
| 2015/0028811 A1 | 1/2015 | Krammer et al. | |
| 2015/0258946 A1* | 9/2015 | Namuduri | B60K 6/40 |
| | | | 307/10.1 |

FOREIGN PATENT DOCUMENTS

| | | |
|---|---|---|
| JP | 2013085394 A | 5/2013 |
| JP | 2014103746 A | 6/2014 |

* cited by examiner

VEHICLE COMPRISING A CHARGING SYSTEM FOR A BATTERY

CROSS REFERENCE TO RELATED APPLICATION

This application claims priority under 35 USC 119 to German Patent Appl. No. 10 2015 102 517.5 filed on Feb. 23, 2015, the entire disclosure of which is incorporated herein by reference.

BACKGROUND

1. Field of the Invention

The invention relates to a vehicle comprising a charging system for a battery and to a charging system.

2. Description of the Related Art

US 2011/0221363 discloses a charging system for a vehicle where the battery of the vehicle is charged via a power supply system terminal, i.e. via an AC voltage.

The object of the invention is to provide a vehicle comprising a charging system having an increased flexibility when charging the battery.

SUMMARY

The invention relates to a vehicle and a charging system configured so that the battery can be charged either with an external AC voltage or with an external DC voltage. For this purpose, two terminals are provided, via which an AC voltage or a DC voltage can be connected to the on-board electrical supply system of the vehicle to charge the battery of the vehicle.

In one embodiment, a switching unit is provided and is configured to connect the external DC voltage i.e. the second terminal, optionally to a converter or directly to the battery. This configuration achieves an increased functionality, so that different external voltage sources, in particular DC voltage sources, can be used for charging the battery via the converter, even if the voltage of the external voltage source does not correspond to the voltage of the battery of the vehicle.

The charging system for the battery comprises a first electrical terminal for an AC voltage that is connected to the charging system. In addition, the charging system comprises a second electrical terminal for a DC voltage. The charging system comprises a converter designed to convert the AC voltage of the first terminal into a DC voltage for charging the battery. The converter also is designed to convert a magnitude of a DC voltage that is passed from the second terminal to the converter in terms of the magnitude and to forward it to the battery. Moreover, the converter is designed to convert the DC voltage of the battery into an AC voltage for driving an electric motor.

In one embodiment, the converter comprises a DC voltage converter and an inverter. The DC voltage converter is designed to be operated in two directions when the inverter is designed to be operated in two directions.

In a further embodiment, the electric motor comprises three phases comprising three coils. The converter comprises two partial converters that are connected in parallel and are connected respectively to a positive and negative supply line of the battery. A first partial converter is connected to an input of the three coils, the second partial converter is connected to an output of the coils, and an electrical line of the second terminal is connected to one of the three coils.

In one embodiment, each coil is subdivided into a first and second partial coil. A center tap is provided between the partial coils of a coil, and the electrical line of the second terminal is connected to at least one center tap.

The electrical line of the second terminal may be led to each coil.

In one embodiment, the second terminal is connected to a switching unit. The switching unit is connected to the converter via first connecting lines and is connected to the battery terminal via second connecting lines. The switching unit is designed to connect the second terminal either to the converter via the first connecting lines or to the battery terminal via the second connecting lines, depending on the electrical voltage at the second terminal.

In one embodiment, the converter comprises three branches each comprising two switches. The branches are connected between the supply lines.

The invention is explained with reference to the figures.

DETAILED DESCRIPTION

Figure 1:
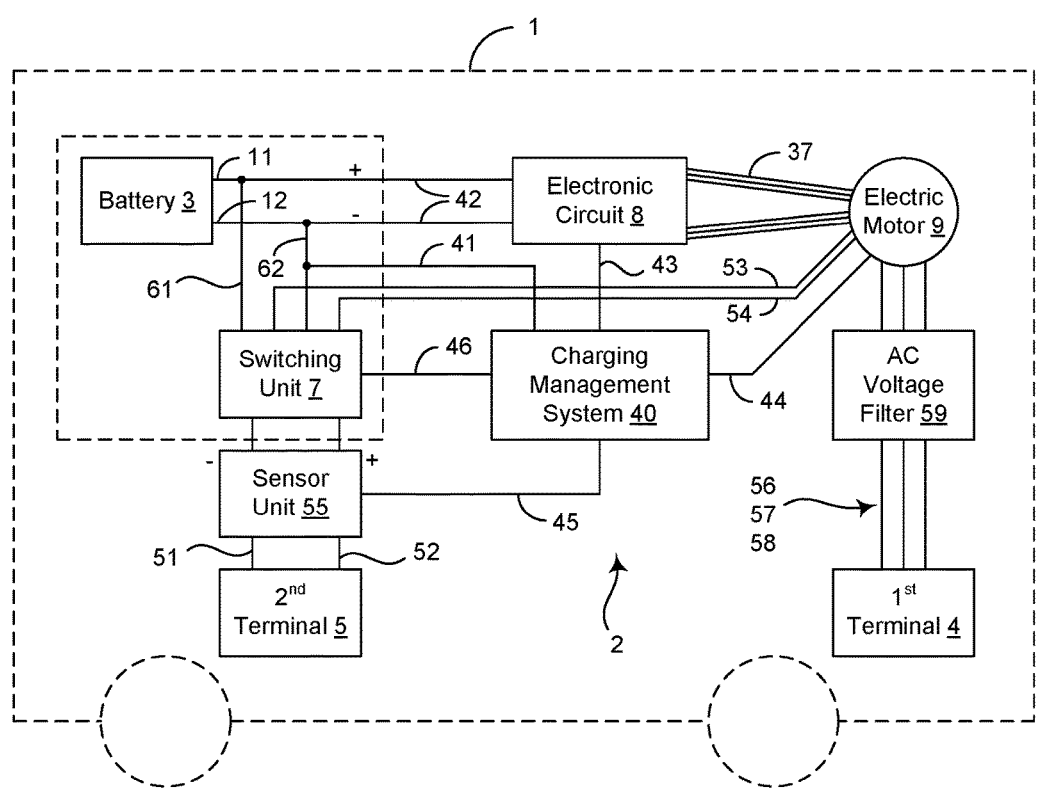
FIG. 1 is a schematic illustration of a vehicle with a charging system for a battery.

FIG. 1 shows a vehicle 1 embodied, for example, as a motorcycle, an automobile or a truck. The vehicle 1 comprises a charging system 2 for charging a battery 3 of the vehicle 1. The battery 3 can be embodied as a high-voltage battery and can provide, for example, electrical voltages in the range of up to 400 V, 800 V or more. Depending on the external voltage source available, conversion of the voltage for charging the battery is or is not necessary. External DC voltage sources can provide 110 volts, 230 volts or 400 V, for example. Consequently, it may be necessary to transform the voltage of the external DC voltage source to a higher voltage to be able to charge the battery of the vehicle. For charging the battery 3 via an external electrical voltage source, provision is made of a first terminal 4 for connection to an external AC voltage source. Furthermore, a second terminal 5 is provided, via which the battery 3 can be charged with the aid of an external DC voltage source. In one simple embodiment, the second terminal 5 is connected directly to the battery or to terminal lines 61, 62 of the battery 3 or is connectable via corresponding switches.

Furthermore, an electronic circuit 8 is provided and is connected to the terminal lines 61, 62 of the battery 3, i.e. to the poles of the battery 3, via lines 42. Moreover, the circuit 8 is connected to coils of the electric motor 9 via further lines 37. The circuit 8 is connected to a charging management system 40 via a first control line 43, and the charging management system 40 is connected to the electric motor 9 via a second measurement line 44. Furthermore, the charging management system 40 is connected to a second sensor unit 55 via a third measurement line 45, and the sensor device 55 is connected to the first and/or the second terminal line 51, 52. Moreover, the charging management system 40 is connected to the switching unit 7 via a second control line 46. The second terminal 5 has a first and a second terminal line 51, 52 that are led to the switching unit 7. Moreover, the terminal lines 61, 62 of the poles 11, 12 of the battery 3 are led to the switching unit 7. Furthermore, a first and/or a second connecting line 53, 54 are/is led from the electric motor 9 to the switching unit 7.

The charging management system 40 controls the switching position of the switching unit 7. In a first switching position of the switching unit 7, the terminal lines 51, 52 of the second terminal 5 are connected directly to the terminal lines 61, 62 of the battery 3 in order to charge the battery via the second terminal 5. The sensor unit 55 detects whether a voltage suitable for charging the battery 3 is present at the second terminal 5. By way of example, the battery 3 can have a rated voltage of 400 to 800 volts. If the DC voltage on the first and second terminal lines 51, 52 has at least the magnitude of the rated voltage of the battery 3, then the charging management system 40 drives the switching unit 7 in such a way that the first and second terminal lines 51, 52 are connected to the terminal lines 61, 62 of the battery 3 if charging is required. The charging voltage of the battery 3 can be detected by the charging management system 40 e.g. via the one further measurement line 41 connected to the terminal lines 61, 62. If charging is required, then the first and second terminal lines 51, 52 are connected directly to the terminal lines 61, 62 of the battery 3 by means of a corresponding driving of the switching unit 7 by the charging management system 40. If the charging management system 40 recognizes that the battery 3 is fully charged, then the charging is ended and the first and/or the second terminal line 51, 52 are/is disconnected from the terminal lines 61, 62 of the battery 3.

Furthermore, a voltage which is present at the connecting lines 51, 52 of the second terminal 5 but which is not suitable for charging the battery owing to an excessively small magnitude of the voltage can be forwarded to the electric motor 9, in particular to coils of the motor 9, via the first and second connecting lines 53, 54 via a corresponding switching position of the switching unit 7. Via the motor 9, the low DC voltage is forwarded via further lines 37 to the circuit 8. In the circuit 8, which is embodied as a converter, the excessively low voltage is transformed to a higher voltage and forwarded to the poles 11, 12 of the battery 3.

The first terminal 4 is connected to coils of the motor 9 via further connecting lines 56, 57, 58. Depending on the embodiment chosen, the first terminal 4 can be connected to the electronic circuit 8 via an AC voltage filter 59. The first terminal 4 is connected to the electronic circuit 8 via the electric motor 9. Moreover, the charging management system 40, with the aid of the second measurement line 44, can detect whether at the motor 9 an AC voltage is present via the further connecting lines 56, 57, 58 of the first terminal 4 a voltage which would be suitable for charging the battery 3. If the charging management system 40 recognizes that an AC voltage suitable for charging the battery is present at the further connecting lines 56 and thus also at the further lines 37, then the charging management system 40 drives the circuit 8 via the control line 43 in such a way as to rectify the AC voltage and to adapt the rectified DC voltage in terms of the magnitude such that charging of the battery 3 is possible via the lines 42.

The electronic circuit 8 comprises a converter that is designed to convert a magnitude of a DC voltage that is passed from the second terminal 5 to the converter in terms of the magnitude and to forward it to the battery for charging the battery. Moreover, the converter can be designed to convert the AC voltage of the first terminal 4 into a DC voltage for charging the battery. Furthermore, the converter is designed to convert the DC voltage of the battery 3 into an AC voltage for driving an electric motor 9.

The electric motor 9 can be embodied as a drive motor for driving wheels of the vehicle. However, the vehicle can also be embodied as a hybrid vehicle, such that the motor is designed to drive the vehicle also only partly or at times. However, the electric motor 9 can also be provided as an auxiliary motor for further units of the vehicle. The electric motor 9 is supplied with current from the battery 3 via the electronic circuit 8.

Figure 2:
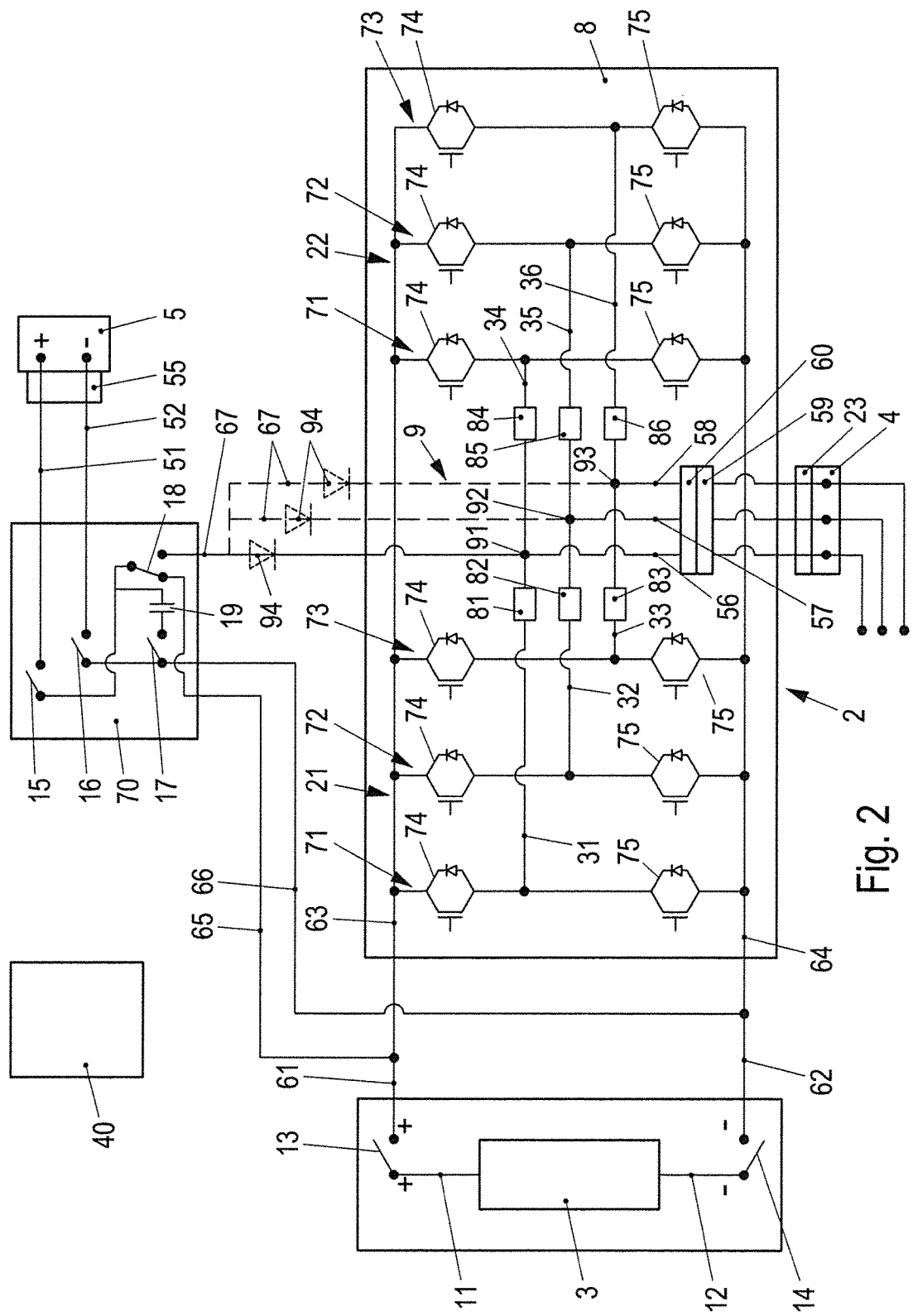
FIG. 2 is a schematic illustration of one embodiment of a charging system.

FIG. 2 shows a detailed illustration of one embodiment of the charging system 2 where the battery 3 has two poles 11, 12 that can be connected to battery lines 61,62 via first and second switch 13, 14, respectively. The first battery line 61 is connected to the positive pole 11 of the battery 3 and also is connected to a first supply line 63 of the electronic circuit 8. The second battery line 62 is connected to the negative pole 12 of the battery 3 and is connected to a second supply line 64 of the electronic circuit 8.

Furthermore, a second switching unit 70 is provided, which comprises a first further line 65. The first further line 65 is connected to the first supply line 63. Moreover, a second further line 66 is led from the second switching unit 70 to the second supply line 64. The first further line 65 is connectable to the first terminal line 51 of the second terminal 5 via a first further switch 15. Moreover, the second further line 66 is connectable to the second terminal line 52 of the second terminal 5 via a second further switch 16. The second switching unit 70 comprises a third further switch 17 that can connect the second further line 66 to the first terminal line 51 via a capacitor 19. Moreover, a fourth further switch 18 is provided in the second switching unit 70 and can produce an electrically conductive connection between the first terminal line 51 and the third further line 67.

The motor 9 is merely illustrated schematically, the illustration showing three phases of the motor 9 comprising three coils. In the embodiment illustrated, the coils are embodied in the form of in each case two series-connected partial coils 81, 82, 83, 84, 85, 86. A center tap 91, 92, 93 is respectively provided between two coils.

The electronic circuit 8 constitutes a converter comprising a first partial converter 21 and a second partial converter 22. The inputs of the first partial converter 21 are connected to the first and second supply lines 63, 64. The first partial converter 21 has three outputs 31, 32, 33, which are connected respectively to a first, second or third partial coil 81, 82, 83 of the motor 9. The first partial coil 81 is connected in series with the fourth partial coil 84. The second partial coil 82 is connected in series with the fifth partial coil 85. The third partial coil 83 is connected in series with the sixth partial coil 86. The first and fourth partial coils, the second and fifth partial coils and the third and sixth partial coils in each case constitute a coil of the electric motor 9. A first center tap 91 is provided between the first and fourth partial coils 81. The second center tap 92 is provided between the second and fifth partial coils 82, 85. The third center tap 93 is provided between the third and sixth partial coils 83, 86.

The inputs of the second partial converter 22 are likewise connected to the first and second supply lines 63, 64. The fourth partial coil 84 is connected to a further first output 34 of the second partial converter 22. The fifth partial coil 85 is connected to a further second output 35 of the second partial converter 22. The sixth partial coil 86 is connected to a further third output 36 of the second partial converter 22. Furthermore, the first terminal 4 is connected to the first center tap 91 via a further connecting line 56 via a filter 59 and a disconnection switching unit 60. Moreover, a further connecting line 57 of the first terminal 4 is connected to the second center tap 92 via the filter 59 and the disconnection switching unit 60. Furthermore, a further connecting line 58 of the first terminal 4 is connected to the third center tap 93 via the filter 59 and the disconnection switching unit 60. The disconnection switching unit 60 makes it possible to disconnect the further connecting lines 56, 57, 58 from the coils of the motor 9.

The first and second partial converters 21, 22 are embodied in such a way as to convert the DC voltage of the battery 3 into an AC voltage in order to drive the electric motor 9 with the aid of the three coils. Moreover, the partial converters 21, 22 can be used to convert the AC voltage applied to the center taps 91, 92, 93 via the further connecting lines 56, 57, 58 into a DC voltage having a corresponding voltage level in order to charge the battery 3 via the first and second supply lines 63, 64.

Furthermore, the third further line 67 of the second switching unit 70 is connected to the first center tap 91. Depending on the embodiment used, in particular on the required electrical power, it is also possible for more than one third further line 67 to be provided in order to connect the second switching unit 70 also to the second and/or to the third center tap 92, 93 in addition to the first center tap 91. If more than one third further line 67 is provided, however, a locking diode 94 must be arranged in each of the third further lines 67, as illustrated using dashed lines in FIG. 2, in order to obtain an electrical isolation of the further connecting lines 56, 57, 58. When exactly one third further line 67 is used, the locking diode 94 is not necessary.

The arrangement in FIG. 2 can have a plurality of switching states. In a first switching state, in which a DC voltage that is high enough to charge the battery is present at the second terminal 5, the first and second terminal lines 51, 52 are connected to the first and second battery lines 61, 62, respectively, via the first further switch 15 and the second further switch 16 and the first and second further lines 65, 66, and the battery 3 is thus charged. The voltage at the second terminal 5 is detected with the aid of a sensor unit 55 and relayed to the charging management system 40. The charging management system 40 is connected to the second switching unit 70 and the switches of the second switching unit 70 via control lines. The charging management system 40 correspondingly switches the first further switch 15, the second further switch 16 and the first switch 13 or the second switch 14 into a closed position. Moreover, the third further switch 17 and the fourth further switch 18 are switched into the open position or held in the open position. Moreover, the first and second switches 13, 14 are switched into a closed position or held in the closed position.

If the charging management system 40 recognizes that a DC voltage is present at the second terminal 5, which DC voltage has, however, a lower voltage than the rated voltage of the battery 3, then the charging management system 40 switches the second and third further switches 16, 17 and the fourth further switch 18 into a closed position. As a result, a negative voltage or ground is applied to the second pole 12 of the battery 3 via the second terminal line 52. Moreover, the positive voltage of the second terminal 5 is applied to the first center tap 91 via the third further line 67. Moreover, the charging management system 40 is connected to the converter 8. The charging management system 40 drives the converter 8 in this switching position in such a way that the DC voltage of the second terminal 5 is raised to the required higher rated voltage of the battery 3 and is fed to the positive pole 11 of the battery 3 via the first supply line 63. Consequently, the converter 8 provided for driving the motor 9 is used as a DC voltage converter and for charging the battery 3. Depending on the embodiment chosen, the converter 8 can have, independently of the partial converters 21, 22, a DC voltage converter which is arranged between the battery 3 and the partial converters 21, 22 and carries out an adaptation of the DC voltage between the battery and the converter.

A further sensor unit 23 is provided at the first terminal 4 and detects whether an AC voltage suitable for charging the battery 3 is present at the first terminal 4. The further sensor unit 23 is connected to the charging management system 40. If the charging management system 40 recognizes that a corresponding AC voltage is present at the first terminal 4, then the first, second, third and fourth further switches 15, 16, 17, 18 are switched into the open position or held in the open position by the charging management system 40. Moreover, the first and second switches 13, 14 are switched into the closed position. Furthermore, the converter 8 is driven by the charging management system 40 in such a way that the AC voltage of the first terminal 4 is rectified and is raised to the voltage level required for charging the battery. The rectified voltage having the correspondingly high voltage level is applied via the first and second supply lines 63, 64 to the poles 11, 12 of the battery 3 for charging the battery 3.

Depending on the embodiment chosen, the first and second switches 13, 14 can also be dispensed with and the first pole 11 of the battery 3 can always be connected to the first battery line 61 and the second pole 12 of the battery 3 can always be connected to the second battery line 62.

The converter 8 can thus be used to charge the battery 3 when an AC voltage is present at the first terminal 4. In this case, the charging takes place via a three-phase voltage system having a voltage of, for example, 230 to 400 V or more.

In order that the converter 8 provided for driving the motor 9 can be used for charging the battery 3, measures are taken to prevent the generation of a torque in the motor 9 during the charging of the battery 3. For this purpose, the coils of the electric motor 9 are divided in each case into the first and fourth, second and fifth, third and sixth partial coils 81, 82, 83, 84, 85, 86, wherein in each case two partial coils are connected in series. The first, second and third partial coils 81, 82, 83 are connected to an AC voltage part of the first partial converter 21. The fourth, fifth and sixth partial coils 84, 85, 86 are connected to an AC voltage part of the second partial converter 22. DC voltage parts of the partial converters 21, 22 are connected to the first and second supply lines 63, 64, to which the battery 3 is connected. The first and second partial converters 21, 22 are controlled synchronously.

For driving the electric motor 9, the two partial converters 21, 22 are operated in a push-pull manner on each of the motor phases, such that the current in the pair of partial coils respectively connected in series flows in the same direction. As a result, a rotating field will be generated which drives the motor 9 with a corresponding torque.

During charging operation, the partial converters 21, 22 can be operated in a push-pull manner in each coil, such that the current in the first partial coil 81 and in the fourth partial coil 84 and respectively in the second partial coil 82 and in the fifth partial coil 85 and respectively in the third partial coil 83 and in the sixth partial coil 86 flows in different directions. The different current directions compensate for a rotating field generated in the respective partial coils, such that no motor torque arises.

In the second charging situation, in which a charging voltage is present at the second terminal 5, but said charging voltage is lower than the desired voltage of the battery 3, the first and second partial converters 21, 22 are driven in such a way as to convert the positive DC voltage of the second terminal 5, which is passed via the third further line 67 to the first center tap 91, via the first and fourth partial coils 81, 84 and the first and second partial converters 21, 22 into a correspondingly higher voltage that is passed via the first supply line 63 and the first battery line 61 to the positive pole 11 of the battery 3.

In the exemplary embodiment illustrated, each partial converter 21, 22 comprises three parallel-arranged branches 71, 72, 73, wherein two switches 74, 75 are connected in series in each branch 71, 72, 73. The ends of the branches 71, 72, 73 are respectively connected to the first and second supply lines 63, 64. The switches 74, 75, embodied as transistors, for example, are driven by the charging management 40 in such a way that the desired rectifier function and/or voltage converter function and/or inverter function are/is provided. Depending on the embodiment chosen, the converter can also comprise other electrical and electronic components and thus be realized in some other way.

What is claimed is:

1. An electric vehicle with a charging system for charging a battery, comprising:
   a first electrical terminal for providing an AC voltage, the first electrical terminal being connected to the charging system; and
   a second electrical terminal for providing a DC voltage, the second electrical terminal being connected to the charging system;
   wherein the charging system comprises a converter designed to convert the AC voltage of the first electrical terminal into a DC voltage for charging the battery and to convert a magnitude of the DC voltage that is passed from the second electrical terminal to the converter in terms of magnitude and to forward the converted DC voltage to the battery;
   wherein the converter is designed to convert the DC voltage of the battery into an AC voltage for driving an electric motor configured to propel the electric vehicle;
   wherein the electric motor includes three phases comprising three coils, each coil of the electric motor comprising a first partial coil, a second partial coil, and a center tap provided between the first partial coil and the second partial coil; and
   wherein an electrical line of the second electrical terminal is connected to at least one center tap.

2. The electric vehicle of claim 1, wherein the converter comprises a DC voltage converter and an inverter, the DC voltage converter is designed to be operated in two directions, and the inverter is designed to be operated in two directions.

3. The electric vehicle of claim 2, wherein the converter comprises first and second partial converters, the first and second partial converters are connected in parallel and are connected respectively to a positive and negative supply line of the battery, the first partial converter is connected to a respective input of the three coils, and the second partial converter is connected to a respective output of the three coils.

4. The electric vehicle of claim 3, wherein an electrical line of the second electrical terminal is led to each coil.

5. The electric vehicle of claim 3, wherein the second electrical terminal is connected to a switching unit, the switching unit is connected to the converter via a third further line and is connected to battery terminals via further lines, the vehicle further comprising a charging management system designed to switch the switching unit depending on the electrical voltage at the second electrical terminal in such a way as to connect the second electrical terminal either to the converter via the electrical line or to the battery terminals via the further lines.

6. The electric vehicle of claim 3, wherein the partial converters are in the form of three parallel-connected branches each comprising two switches, the branches being connected between the supply lines.

7. A charging system for charging a battery, comprising:
   a first electrical terminal for providing an AC voltage;
   a second electrical terminal for providing a DC voltage; and
   a converter designed to convert the AC voltage of the first electrical terminal into a DC voltage for charging the battery and designed to convert a magnitude of the DC voltage that is passed from the second electrical terminal to the converter in terms of the magnitude and to forward the converted DC voltage to the battery;
   wherein the converter is designed to convert the DC voltage of the battery into an AC voltage for driving an electric motor configured to propel an electric vehicle;
   wherein the electric motor includes three phases comprising three coils, each coil of the electric motor comprising a first partial coil, a second partial coil, and a center tap provided between the first partial coil and the second partial coil; and
   wherein an electrical line of the second electrical terminal is connected to at least one center tap.

8. The charging system claim 7, wherein the converter comprises a DC voltage converter and an inverter, the DC voltage converter being designed to be operated in two directions, and the inverter being designed to be operated in two directions.

9. The charging system of claim 8, wherein the converter comprises first and second partial converters connected in parallel and respectively connected to a positive and negative supply line of the battery, the first partial converter being connected to a respective input of the three coils, the second partial converter being connected to a respective output of the three coils.

10. The charging system of claim 7, wherein an electrical line of the second electrical terminal is led to each coil.

11. The charging system of claim 7, wherein the second electrical terminal is connected to a switching unit, the switching unit is connected to the converter via a third further line and is connected to battery terminals via further lines, the charging system further comprising a charging management system designed to switch the switching unit depending on the electrical voltage at the second electrical terminal in such a way as to connect the second electrical terminal either to the converter via the electrical line or to the battery terminals via the further lines.

12. The charging system of claim 11, wherein the partial converters are embodied in the form of three parallel-connected branches each comprising two switches, the branches being connected between the supply lines.

* * * * *